Aug. 1, 1961 R. MATTHEWS 2,994,868

RADAR DISPLAY APPARATUS

Filed May 27, 1957 4 Sheets-Sheet 1

2,994,868
Patented Aug. 1, 1961

2,994,868

RADAR DISPLAY APPARATUS

Robert Matthews, London, England, assignor to The Decca Record Company Limited, London, England, a British company Filed May 27, 1957, Ser. No. 661,699
5 Claims. (Cl. 343—11)

This invention relates to cathode ray tube deflection circuits for providing radial scanning of the cathode ray beam and is particularly applicable to plan position radar display systems in which echoes are displayed on a cathode ray tube as a brightness modulation of a repetitively scanned line trace which is rotated on the screen of the tube in synchronism with the angular movement of a rotatable aerial. This application is a continuation-in-part of application Serial No. 540,078, filed October 12, 1955, and entitled "Radar Display Apparatus," now U.S. Patent No. 2,905,938, issued September 22, 1959.

According to this invention, in a cathode ray tube deflection circuit for providing radial scanning of the cathode ray beam, there are provided, for each of two transverse components of deflection, a pair of fixed deflector means, a first amplifier with alternatively switchable first and second feed back and input circuits to generate alternative waveforms, the first feedback and input circuit being operable to produce a waveform of constant output level dependent on the magnitude of an applied shift signal and the second feedback and input circuit being operable to produce a waveform starting from a level dependent on the output level of said first amplifier during the preceding operation of the first feedback and input circuit and varying at a rate dependent on the magnitude of an applied scanning control signal, which first amplifier provides signals for one of said pair of deflector means, and a paraphase amplifier for deriving, from the output of the first amplifier, signals for applying to the other of said pair of deflector means, such that the deflection fields vary similarly and assist one another. With this arrangement a signal determining the rate of scan is applied to the second feedback and input circuit and a signal determining the position of the start of the scan in the screen of the tube, that is to say an off-centering control signal, is applied to the first feedback and input circuit. Since the first amplifier and the paraphase amplifier assist one another the power drain on the system is maintained at a minimum and in an electromagnetically deflected system using detector coils, the current drain will be substantially independent of the amount of off-centering.

In one arrangement of cathode ray tube deflection circuit, there are provided, for each of two transverse components of deflection, a pair of fixed deflector means, a first amplifier with two alternative feedback and input circuits, the first feedback and input circuit comprising a resistive feedback and a resistive input through which a shift voltage may be applied to the amplifier and the second feedback and input circuit comprising a capacitive feedback which is always connected to the amplifier output so that the capacity is always charged to the amplifier output voltage level and a resistive input through which a scanning rate control voltage may be applied to the amplifier, switching means for connecting the first feedback and input circuit to the amplifier input terminal before the start of a scan and operable to disconnect this circuit and to connect the second feedback and input circuit to the amplifier input terminal for the duration of the required scan, which first amplifier provides signals for one of said pair of deflector means, and a paraphase amplifier for deriving from the output of the first amplifier signals for applying to the other of said pair of deflector means such that the deflection fields vary similarly and assist one another.

The aforementioned first feedback and input circuit may comprise first and second resistors connected in series with the outer end of the first resistor connected to the output of the first amplifier and means for applying a shift voltage to the outer end of said second resistor and the aforementioned second feedback and input circuit may comprise a third resistor in series with a capacitor, the plate of the capacitor remote from the third resistor being connected to the amplifier output and means for applying a scanning rate control voltage to the end of the third resistor remote from the capacitor and said switching means may be arranged to connect the amplifier input alternatively to the junction of the first and second resistors or to the junction of the capacitor and the third resistor.

The arrangements described above may be used for electrostatic or electromagnetic deflection of the cathode ray tube. If electromagnetic deflection is used, the aforesaid deflector means may each comprise a deflector coil and said first amplifier and said paraphase amplifier may each be coupled to their associated deflector coil by means including a current-generating valve producing a deflection current corresponding to the amplifier output voltage.

As previously indicated this invention finds particular application in a plan position radar display system in which echoes are displayed on a cathode ray tube as brightness modulation of a repetitively scanned line trace which is rotated on the screen of the tube in synchronism with the angular movement of a rotatable aerial. Such a system may comprise a cathode ray tube deflection circuit as described above, a sine-cosine signal generator unit for producing two direct voltages representative of the sine and cosine respectively of the angular position of the aerial and means for applying said direct voltages to the two second feedback and input circuits of deflection circuits associated respectively with two orthogonal components of deflection of the cathode ray beam.

In the following description, referenc is made to the accompanying drawings in which.

Figure 1:
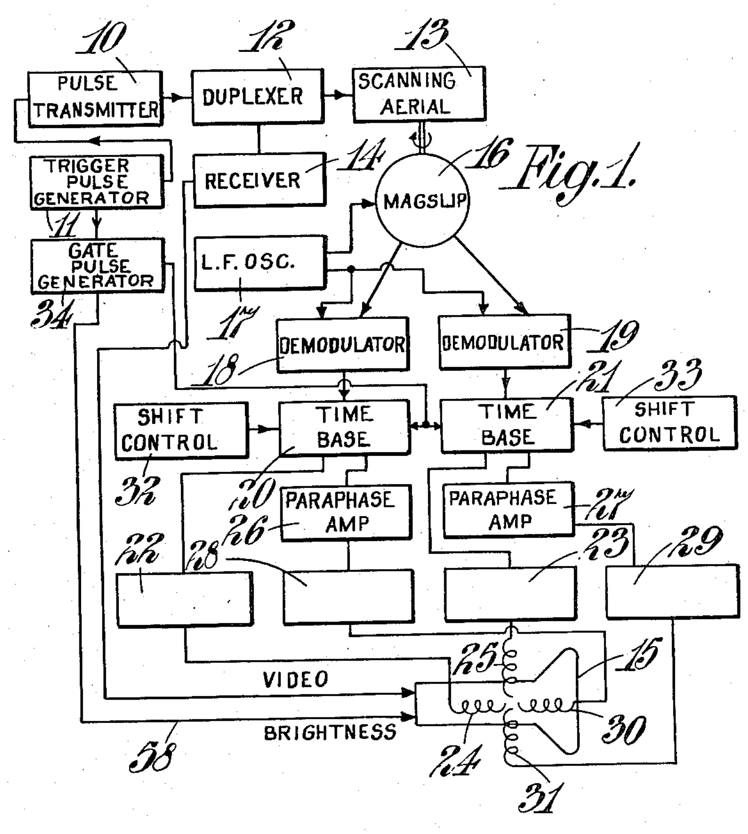
FIGURE 1 is a block diagram of a pulse radar apparatus having an electromagnetically deflected cathode ray display tube.

Referring to FIGURE 1, there is shown a block diagram of a pulse radar apparatus which has a pulse transmitter 10 for producing regularly recurring pulses of microwave energy in synchronism with trigger pulses produced by a trigger pulse generator 11. The microwave pulses are fed through a duplexer 12 to a rotatable scanning aerial 13. Echoes of the radiated pulses received by the aerial 13, after passing through the duplexer 12, are fed to a receiver 14 which provides a video signal output which is applied as a brightness modulation to a cathode ray tube 15.

The scanning aerial 13 is mechanically coupled to a magslip 16 which resolves a low frequency input signal from an oscillator 17 into sine and cosine components representative of the angular position of an aerial 13. The two outputs from the magslip 16 are fed directly to two demodulators 18, 19 which provide direct voltages proportional to the sine and cosine of the angular position of the aerial and these two direct voltages are employed respectively to control the amplitude of saw-tooth voltages generated by two saw-tooth time base generators 20, 21 respectively to be described in further detail later. The instant of starting and the duration of the saw-tooth waveforms are determined by gate pulses from a gate pulse generator 34 controlled by the aforementioned trigger pulse generator 11. The two time base generators 20, 21 generate saw-tooth voltages and have associated current generators 22, 23 to provide saw-tooth currents for feeding to orthogonal deflection coils 24, 25 of the cathode ray tube 15. Also associated respectively with the two time-base generators 20, 21 are two paraphase amplifiers 26, 27 to provide saw-tooth voltage outputs of opposite polarity to those of the associated time base generators and these, by means of current generators 28, 29 feed two further orthogonal deflector coils 30, 31. The currents in the two coils 24, 30 assist one another in producing deflection of the cathode ray beam in one direction and the currents in the other two coils 25, 31 assist in producing currents in an orthogonal direction. It will be seen that this arrangement provides a radial scan on the screen of the cathode ray tube which is rotated in synchronism with the rotation of the aerial 13 and, since the video output from the receiver 14 is applied to modulate the beam, a plan position display is obtained on the screen of the tube. Shift control units 32, 33 the operation of which will be described later are provided for off-centering the centre of rotation of the trace on the screen of the tube.

Figures 2, 4:
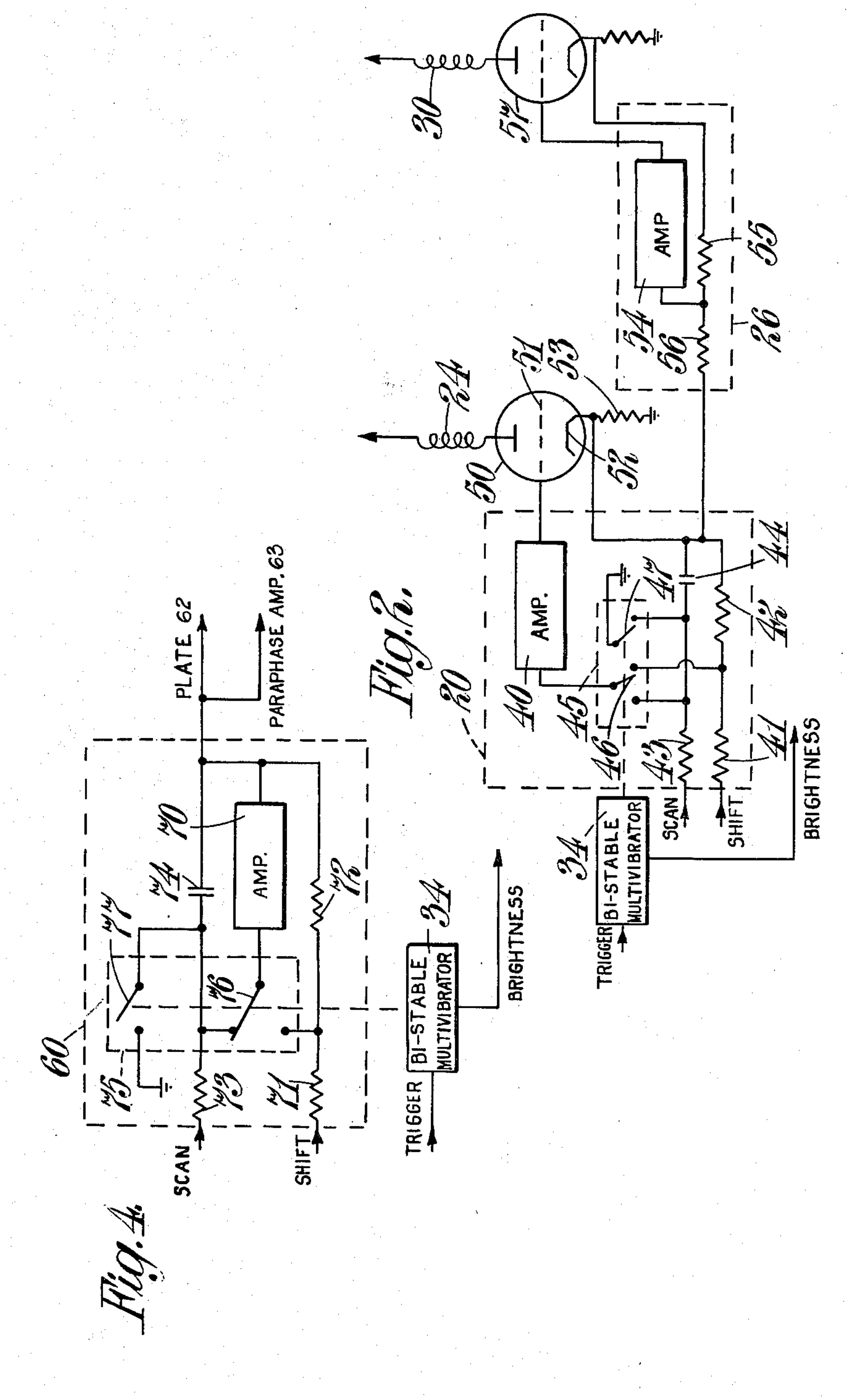
FIGURE 2 is a diagram illustrating in further detail part of the apparatus of FIGURE 1.
FIGURE 4 is a diagram showing in further detail part of the apparatus of FIGURE 3.

FIGURE 2 illustrates in further detail the deflection means associated with deflector coils 24, 30. The time base generator 20 includes a high gain amplifier 40 having two alternative feedback and input circuits. The first feedback and input circuit comprises an input resistor 41 in series with a feedback resistor 42 and the second feedback and input circuit comprises an input resistor 43 in series with a feedback capacitor 44. The input terminal of the amplifier 40 may be connected by means of an electronic switch 45 either to the junction of the resistors 41, 42 or to the junction of the resistor 43 and capacitor 44, this switching being indicated diagrammatically as being effected by a movable switch contact 46. The output of the amplifier 40 may, for the present, be assumed to be connected to that plate of the capacitor 44 which is remote from the resistor 43 and also to the end of the resistor 42 remote from the resistor 41. The electronic switch 45 also serves to connect, as is indicated diagrammatically by a switch contact 47, the junction of the resistor 43 and capacitor 44 to earth when this junction point is not connected to the amplifier input. The scanning rate control voltage from the demodulator 18 is applied to the input resistor 43 and an off-centering control voltage from the shift control unit 32 is applied to the resistor 41. Assuming firstly that the resistor 42 is connected as the feedback circuit across the amplifier 40, it can be seen that the shift control voltage is applied through the resistor 41 to the input of the amplifier. Provided the gain of the amplifier is very high, the voltage output from the amplifier in this circuit condition will be substantially a constant voltage proportional to the shift control voltage, the proportionality factor being the ratio of the magnitude of the resistor 42 to the magnitude of the resistor 41. If, on the other hand, the switch contact 46 is in the position so that the capacitor 44 is connected as the feedback circuit, it will be seen that the scanning rate control voltage is now applied through the resistor 43 to the input of the amplifier 40. With the capacitive feedback the amplifier will generate a saw-tooth voltage which will start from the voltage datum to which the capacitor 44 has been previously charged, that is the previously mentioned constant voltage proportional to the shift control voltage. The amplifier 40 will thus generate a saw-tooth voltage waveform starting from a value dependent on the previously applied shift control voltage and having a rate dependent on the applied scanning control voltage. In order to produce a corresponding current in the deflector coil 24, the voltage output of the amplifier 30 is applied to a current generator 22 comprising a valve 50 conveniently by applying the output voltage to the grid 51 of the valve and connecting the cathode 52 which is earthed through a cathode resistor 53, to the feedback circuit of the amplifier at the junction of the capacitor 44 and resistor 42. The cathode to grid circuit of the valve 50 is thus included in the feedback loop of the amplifier 40.

For providing the current through the deflector coil 30, the paraphase amplifier 26 comprises a high gain amplifier 54 having a resistive feedback circuit 55 and resistive input circuit 56. This amplifier operates, in a manner similar to the aforementioned amplifier 40 with its resistive input and feedback circuit 41, 42 to produce a voltage output proportional to the applied voltage input, which input, in the case of amplifier 54 is taken from the output of amplifier 40. To provide the necessary current output the voltage output of the amplifier 54 is applied to a current generating valve 57 which may be similar to the current generating valve 50 and has its cathode to grid circuit included in the feedback loop of amplifier 54.

It will be seen that since the two deflection coils 24 and 30 assist one another, the total current required by the two coils and hence the total current drain will remain substantially constant and will be independent of the amount of off-centering. Furthermore it will be seen that the shift controls 32 and 33 required for the off-centering need merely be potentiometers for applying an adjustable shift voltage to the appropriate input circuits of the time base generators.

The aforementioned electronic switch 45 may conveniently be controlled by a bi-stable multivibrator triggered from the trigger pulse generator 11, this bi-stable multivibrator thus constituting the aforementioned gate pulse generator 34. This multivibrator may also be conveniently used to provide a brightening pulse for the cathode ray tube as indicated at 58 in FIGURE 1.

Figure 3:
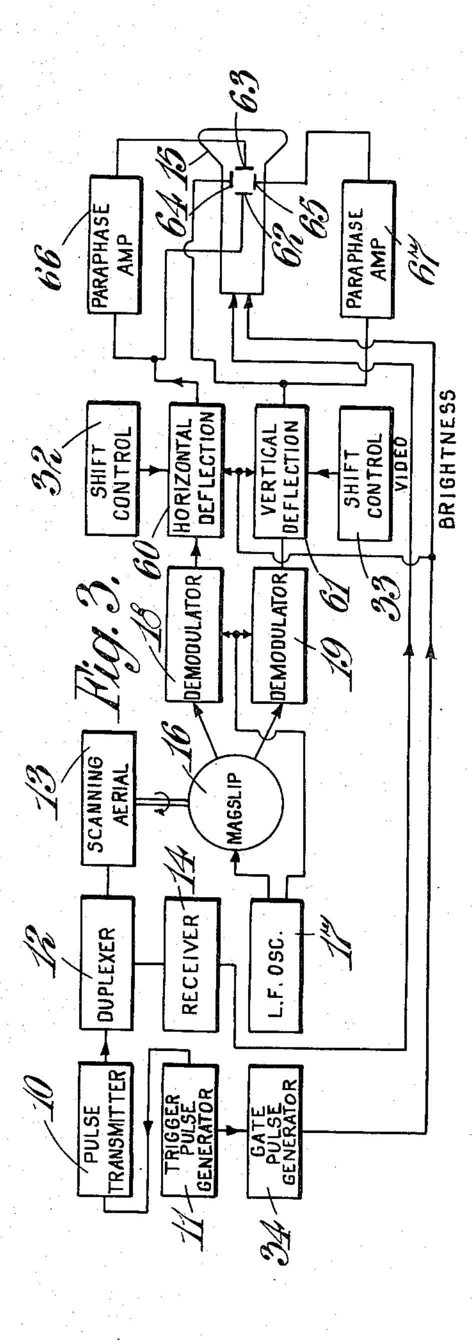
FIGURE 3 is a block diagram of a pulse radar apparatus having an electrostatically deflected cathode ray display tube.

FIGURE 3 illustrates a pulse radar apparatus having an electrostatically deflected cathode ray tube. Parts of the apparatus which are similar in FIGURES 1 and 3 have for convenience been given like reference characters. Referring to FIGURE 3, a pulse transmitter 10 produces regularly recurring pulses of microwave energy in synchronism with the trigger pulses produced by a trigger pulse generator 11. The microwave pulses are fed through a duplexer 12 to a rotatable scanning aerial 13 and echoes of the radiated pulses, after reception by the aerial, are passed through the duplexer 12 to a receiver 14 which provides a video signal output applied as a brightness modulation to a cathode ray tube 15.

The scanning aerial 13 is mechanically coupled to a magslip 16 into which is fed a low frequency input signal from an oscillator 17. The magslip provides sine and cosine components of this signal representative of the angular position of the aerial and these components are fed to two demodulators 18, 19 which provide direct sine and cosine voltages for application to horizontal and vertical deflection scanning generators 60, 61. The cathode ray tube 15 has two orthogonal pairs of deflector plates 62, 63 and 64, 65 for electrostatic deflection of the cathode ray beam. The output of the scanning generator 60 is applied to one deflector plate 62 and is also applied to a paraphase amplifier 66 for providing a corresponding scanning deflection voltage of opposite polarity for the plate 63. Similarly the vertical deflection unit 61 provides a vertical deflection scanning voltage for the plate 64 and, by means of a paraphase amplifier 67, provides the deflection voltage for the plate 65. Shift control units 32, 33 are provided for off-centering the centre of rotation of the trace on the screen of the tube.

The horizontal deflection unit 60 is illustrated in further detail in FIGURE 4 and comprises a high gain amplifier 70 having two alternative feed-back and input circuits. The first feedback and input circuit comprises a resistor 71 in series with a resistor 72 and the second feedback and input circuit comprises a resistor 73 in series with a capacitor 74. By means of an electronic switch 75, the input terminal of the amplifier 70 may be connected either to the junction of the resistors 71, 72 or to the junction of the resistor 73 and capacitor 74, this switching being indicated diagrammatically as being effected by a movable switch contact 76. The output of the amplifier is connected to that plate of the capacitor 74 which is remote from the resistor 73 and also to the end of the resistor 72 remote from the resistor 71. The electronic switch 75 also serves to connect, as is indicated diagrammatically by the switch contact 77, the junction of the resistor 73 and the capacitor 74 to earth when this junction point is not connected to the amplifier input. The scanning rate control voltage from the demodulator 18 is applied to the input resistor 73 and an off-centering control voltage from the shift control unit 32 is applied to the input resistor 71. This time base generating circuit operates in a similar manner to that described with reference to FIGURE 2 and will provide a saw-tooth output voltage at a rate dependent upon the applied scanning rate control signal starting from a datum voltage dependent on the voltage datum to which the capacitor 74 has previously been charged. As in the arrangement of FIGURES 1 and 2, the gate pulse generator 34 may conveniently comprise a bi-stable multivibrator which serves also to operate the electronic switch 75 and to apply a brightening pulse to the cathode ray tube.

Figure 5:
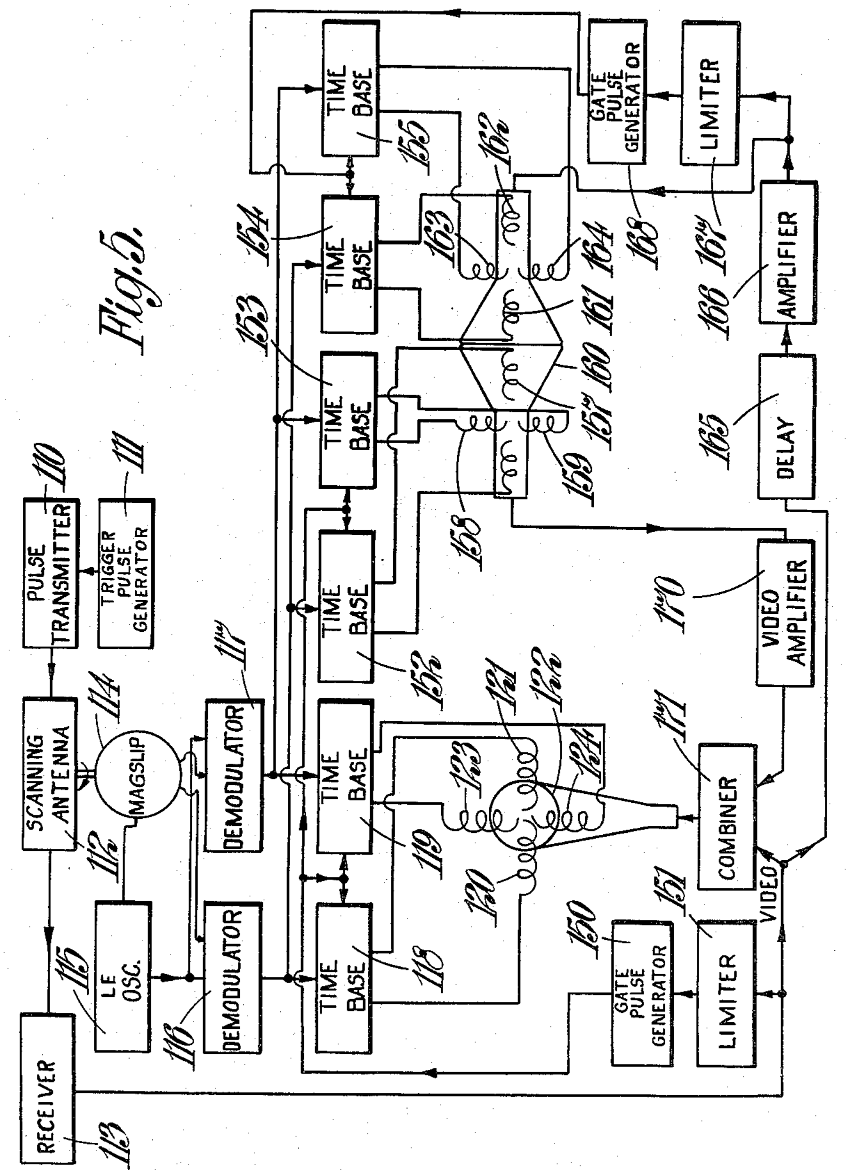
FIGURE 5 is a block diagram of a pulse radar apparatus embodying a static target cancellation system.

Referring to FIGURE 5 there is illustrated diagrammatically a pulse radar system having a pulse transmitter 110 of which the pulse recurrence frequency is controlled by a trigger pulse generator 111. The output of the transmitter is radiated by a scanning antenna 112 and the echoes received from targets are fed from this scanning antenna to a receiver 113 which provides a video-frequency output.

The scanning antenna 112 is mechanically coupled to a magslip 114 which resolves a low frequency input signal from an oscillator 115 into sine and cosine components representative of the angular position of the antenna. The two outputs from the magslip 114 are fed respectively to two demodulators 116, 117 which provide direct voltages proportional to the sine and cosine of the angular position of the antenna and these two direct voltages are employed respectively to control the amplitude of saw-tooth currents generated by two saw-tooth time-base generators 118, 119 respectively. The instant of starting and the duration of the saw-tooth currents are determined by gate pulses from a gate pulse generator 125 which is controlled by the trigger pulse generator 111. Each of the time-base generators 118, 119 in the arrangement of FIGURE 5 also includes a paraphase amplifier so that two saw-tooth outputs of opposite polarity are provided. The two outputs from the time-base generator 118 are fed respectively to a pair of deflector coils 120, 121 of a cathode ray tube 122, and the two outputs from the time-base generator 119 are fed respectively to a second pair of deflector coils 123, 124. This arrangement thus provides a radial scan on the screen of the cathode ray tube which scan is rotated in synchronism with the rotation of the scanning antenna, and, if the video output of the receiver 113 were applied directly to the tube 122 to modulate the beam thereof, a plan-position display would be obtained on the screen as in the arrangement of FIGURES 1 and 2.

The time-base generators 118, 119 are controlled by means of a gate pulse from a gate pulse generator 150 which determines the instant of start and duration of the saw-tooth waveforms. This gate pulse generator provides gate pulses synchronised from the received radar ground-wave signals by means of a limiter 151 to which is applied the video output from the receiver 113, the limiter being arranged to separate the large amplitude ground-wave from the other video signals.

The demodulators 116, 117 also control four further time-base generators 152, 153, 154, 155. The two time-base generators 152, 153 feed the four deflector coils 156, 157, 158, 159 controlling the reading beam of a storage-type cathode ray tube 160 and the two time-base generators 154, 155 feed deflector coils 161, 162, 163, 164 controlling the writing beam of the tube 160. The time-base generators 152, 153 are controlled from the gate pulse generator 150 but the time-base generators 154, 155 are triggered at a short time after the other four time-base generators, this delay being effected by means of an electrical delay circuit 165 into which video output from the receiver 113 is fed. The video signals, after passing through the delay circuit, are amplified by an amplifier 166 and fed to a limiter 167 which separates the large amplitude ground wave from the other video signals. The ground wave signals are fed to a gate pulse generator 168 for generating gate pulses for controlling the start and duration of the saw-tooth waveforms from the time-base generators 154, 155. The output from the amplifier 166 is also used to modulate the writing beam of the storage-type cathode ray tube 160. It will thus be seen that the time-bases for the writing beam are delayed by a short time with respect to the time-bases for the reading beam and for the display tube 122 and that the same delay is also applied to the video signals which are used to modulate the writing beam. The output from the reading beam of the tube 160 is amplified by an amplifier 170 and fed to a combiner 171 where it is mixed with the video output from the receiver 113 in a manner such that the signals from the amplifier 170 are subtracted from the received signals. The output from the combiner 171 is applied between the grid and cathode of the tube 122 to modulate the brightness of the beam thereof. The amplifier 170 preferably has a variable gain so that the relative amplitude of the signals fed to the combiner 171 may be adjusted to cancel static targets on the display tube 122.

The storage tube 160 is preferably of the type in which the reading beam removes any stored signals but alternatively it is possible to provide a separate cancelling circuit for cancelling all stored signals one per revolution of the antenna.

It will be seen that, in the arrangement of FIGURE 5, the writing beam of the storage tube is scanned so as to be always a small distance behind the reading beam, whilst the reading beam is scanned in synchronism with the display tube 122. Thus, provided adjacent traces on the storage tube do not overlap, the reading beam is very nearly one display period (that is to say one antenna revolution in the case of a plan-position display) behind the writing beam and this arrangement will cause the reduction in amplitude or cancellation from the input to the tube 122 of signals appearing on the previous display. However, even if adjacent traces on the storage tube should overlap and the delay in the writing beam is such that the reading beam reads the immediately previously written trace, then the arrangement will operate to reduce in amplitude or cancel signals appearing on the previous trace. In either case the display will show moving targets whilst reducing in amplitude or cancelling static targets. It will be particularly noted that this arrangement only requires a short delay, the period of which is not critical and this delay (which might, for example, be of the order of 10–30 microseconds), may readily be produced by the electrical delay circuit 165. The video signals and the gate pulse for the writing beam time-bases are delayed by exactly the same amount since the gate pulse is obtained from the video signals, and it will be noted that the gate pulses for the time-base generators 118, 119, 152 and 153 are derived from the received signals in the same manner as the gate pulses for time-base generators 154, 155 so ensuring that there is no difference in the timing of the gate pulses apart from the delay introduced by the delay circuit 165.

In the arrangement of FIGURE 5, the representation on the storage tube is made similar to the required display. This is not essential but it is preferable since it enables similar scanning systems to be employed thus facilitating the obtaining of exactly similar scanning. Furthermore all the time-base generators are controlled in amplitude of saw-tooth waveforms by direct voltages obtained from demodulating resolved components obtained from a magslip; this arrangement further assists in enabling a high degree of similarity between the various scans to be obtained.

I claim:

1. In cathode ray tube display apparatus having a cathode ray tube with a pair of fixed deflector means for deflecting the cathode ray beam in each of two transverse directions, a circuit for scanning the cathode ray beam comprising, for each pair of deflector means, first and second input terminals, a first amplifier having an input and an output, first and second feedback and input circuits for said first amplifier, the first feedback and input circuit including a feedback resistor and an input resistor in series with the feedback resistor connected to the amplifier output and the input resistor connected to said first input terminal and the second feedback and input circuit including a feedback capacitor and an input resistor in series with the feedback resistor connected to the amplifier output and the input resistor connected to said second input terminal, switching means for connecting the junction of the input resistor and feedback resistor of said first feedback and input circuit and the junction of the input resistor and feedback capacitor of said second feedback and input circuit to the amplifier input whereby said first amplifier with said first feedback and input circuit produces a waveform of constant output level dependent on the magnitude of a shift signal applied to said first input terminal and said first amplifier with said second feedback and input circuit produces a wavefore starting from a level dependent on the output level of said first amplifier during its preceding operation and varying at a rate dependent on the magnitude of a control signal applied to said second input terminal, and paraphase amplifying means coupled to said first amplifier output and feeding the associated pair of deflector means with paraphase signals having waveforms corresponding to the output of said first amplifier so that the deflection fields vary similarly and assist one another.

2. In cathode ray tube display apparatus having a cathode ray tube with a pair of fixed deflector means for deflecting the cathode ray beam in each of two transverse directions, a circuit for scanning the cathode ray beam comprising, for each pair of deflector means, first and second input terminals, a first amplifier having an input and an output, first and second feedback and input circuits for said first amplifier, the first feedback and input circuit including a feedback resistor and an input resistor in series with said input resistor connected to said first input terminal and said feedback resistor connected to said amplifier output and the second feedback and input circuit including a feedback capacitor and input resistor in series with said input resistor connected to said second input terminal and said feedback capacitor connected to the amplifier output, switching means for connecting the junction of the input resistor and feedback resistor of said first feedback and input circuit and the junction of the input resistor and feedback capacitor of said second feedback and input circuit to the amplifier input whereby said first amplifier with said first feedback and input circuit produces a waveform of constant output level dependent on the magnitude of a shift signal applied to said first input terminal and said first amplifier with said second feedback and input circuit produces a waveform starting from a level dependent on the output level of said first amplifier during its preceding operation and varying at a rate dependent on the magnitude of a control signal applied to said second input terminal, a paraphase amplifier coupled to the output of said first amplifier to produce a paraphase waveform and means coupling the associated pair of deflector means respectively to said first amplifier and said paraphase amplifier so that the deflection fields vary similarly and assist one another.

3. In cathode ray tube display apparatus having a cathode ray tube with a pair of fixed deflector means for deflecting the cathode ray beam in each of two transverse directions, a circuit for scanning the cathode ray beam comprising, for each pair of deflector means, a source of shift voltage, a source of scanning rate control voltage, an amplifier having an input and an output, first and second resistors connected in series, means connecting the outer end of said first resistor to said amplifier output, means connecting the outer end of said second resistor to said source of shift voltage, a third resistor and a capacitor in series, means connecting the outer end of said third resistor to said source of scanning rate control voltage, means connecting the plate of said capacitor remote from said third resistor to said amplifier output, and switching means operative to connect the amplifier input alternatively to the junction of said first and second resistors or to the junction of the capacitor and said third resistor.

4. A cathode ray tube deflection circuit as claimed in claim 2 wherein said deflector means each comprise a deflector coil for electro-magnetic deflection of the cathode ray beam and wherein said first amplifier and said paraphase amplifier are each coupled to their associated deflector coil by means including a current-generating valve producing a deflection current corresponding to the amplifier output voltage.

5. A plan position radar display system in which echoes are displayed on a cathode ray tube as a brightness modulation of a repetitively scanned line trace which is rotated on the screen of the tube in synchronism with the angular movement of a rotatable aerial which system comprises a cathode ray tube deflection circuit having for each of two transverse components of deflection, a pair of fixed deflector means, first and second input terminals, a first amplifier having an input and an output and with first and second feedback and input circuits the first feedback and input circuit comprising a resistive feedback circuit connected to the amplifier output and a resistive input circuit between the amplifier input and said first input terminal through which a shift voltage may be applied to the amplifier and the second feedback and input circuit comprising a capacitive feedback circuit which is always connected to the amplifier output so that the capacity is always charged to the amplifier output voltage level and a resistive input circuit between the amplifier input and said second input terminal through which a scanning rate control voltage may be applied to the amplifier, switching means for connecting the first feedback and input circuit to the amplifier input before the start of a scan and operable to disconnect this circuit and to connect the second feedback and input circuit to the amplifier input for the duration of the required scan, which first amplifier provides signals for one of said pair of deflector means, and a paraphase amplifier for deriving, from the output of the first amplifier, signals for applying to the other of said pair of deflector means such that the deflection fields vary similarly and assist one another, said plan position radar display system further including a sine-cosine signal generator unit for producing two direct voltages representative of the sine and cosine respectively of the angular position of the aerial and means for applying said direct voltages to said second input terminals of the two second feedback and input circuits of deflection circuits associated respectively with two orthogonal components of deflection of the cathode ray beam.

References Cited in the file of this patent

UNITED STATES PATENTS 2,717,330 Meagher ---------------- Sept. 6, 1955